United States Patent [19]
Fox et al.

[11] Patent Number: 5,491,629
[45] Date of Patent: Feb. 13, 1996

[54] SYSTEM AND METHOD FOR DETERMINING THE IMPACT OF WEATHER AND OTHER FACTORS ON MANAGERIAL PLANNING APPLICATIONS

[75] Inventors: Frederick D. Fox, Philadelphia; Douglas R. Pearson, Wyomissing; Mike A. Rhoads, Mount Penn; Peter A. Zaleski, Havertown, all of Pa.

[73] Assignee: Strategic Weather Services, Wayne, Pa.

[21] Appl. No.: 205,494

[22] Filed: Mar. 4, 1994

[51] Int. Cl.$^6$ .................................................. G06F 17/00
[52] U.S. Cl. .............................................................. 364/420
[58] Field of Search ...................................... 364/401, 403, 364/420

[56] References Cited

FOREIGN PATENT DOCUMENTS 4135271  5/1992  Japan ....................... 304/401

*Primary Examiner*—Gail O. Hayes
*Assistant Examiner*—Charles R. Kyle
*Attorney, Agent, or Firm*—Sterne, Kessler, Goldstein & Fox

[57] ABSTRACT

A computer-based Executive Information System (EIS) system for determining the impact of weather and other external and internal factors on the retail industry. Utilizing a multiple regression correlation technique in a predictive model, a correlation of weather variables with store information for specific locations and times is performed to quantify a weather impact model in terms of unit or dollar sales volume change, or any other commercially useful benchmark. The EIS system determines these relationships with location and time specificity. Using the relationship between historical weather and historical sales, the EIS system "deweatherizes" the historical weather to create a normalized historical sales relative to weather based upon normal weather (the 30 year average). This deweatherized data may be used in conjunction with a user-provided managerial plan to produce a revised managerial plan. Alternatively, the revised plan can be "weatherized" by the EIS system by applying forecasted weather to the weather impact model to generate a weather-modified managerial plan.

36 Claims, 9 Drawing Sheets

SYSTEM AND METHOD FOR DETERMINING THE IMPACT OF WEATHER AND OTHER FACTORS ON MANAGERIAL PLANNING APPLICATIONS

BACKGROUND OF THE INVENTION

1. Field of the Invention

The present invention relates generally to predicting consumer demand patterns relative to the retail industry, and more particularly, to identifying the impact of weather and other factors on retail sales.

2. Related Art

A. Historical Perspective of Retailing

The retail industry has historically been influenced by the shape of the times. For example, the retail industry is impacted by war and peace, lifestyle changes, demographic shifts, attitude progressions, economic expansion and contraction, tax policies, and currency fluctuations.

The period from 1965 to 1975 was marked by growth and segmentation in the retail industry. New types of stores such as department stores, specialty stores, and discount stores appeared, increasing competition in the retail industry. One result of this growth was a decrease in gross margin (sales price—cost of goods sold). Another result was a shifting of supply sources. Originally, merchandise was supplied exclusively by vendors. However, segmentation and growth resulted in specialty chains and discounters manufacturing merchandise in-house (commonly known as vertical integration).

The period from 1975 to 1980 was marked by disillusionment and complexity in the retail industry. Inflation and women entering the work force in significant numbers resulted in a more sophisticated consumer. Many retailers began to rethink the basics of merchandising in terms of merchandise assortments, store presentations, customer service, and store locations. Other less sophisticated retailers continued on an undisciplined and unstructured policy of store growth.

The period from 1980 to 1990 was marked by recovery and opportunity in the retail industry. An economic boom stimulated consumer confidence and demand. This, coupled with the expansion of the previous period, paved the way for the retail industry to overborrow and overbuild. With their increased size, retailers became increasingly unable to manage and analyze the information flowing into their organizations.

B. Retailing Problems and Opportunities of Today

The problems and opportunities facing the retailer fall into two categories of factors: (1) external factors; and (2) internal (or industry) factors. External factors impacting the retail industry include, for example, adverse or favorable weather, rising labor costs, increasing property costs, increased competition, economics, increasing cost of capital, increasing consumer awareness, increasing distribution costs, changing demographics and zero population growth, decreasing labor pool, and flat to diminishing per capita income.

Internal (or industry) factors affecting the retail industry include, for example, large number of stores (decentralization), homogeneity among retailers, continuous price promotion (equates to decreased gross margin), decreasing customer loyalty, minimal customer service, physical growth limitations, and large quantities of specific retailer store information.

Growth and profitability can only be achieved by maximizing the productivity and profitability of the primary assets of the retail business: merchandise (inventory), people, and retail space. The above external and industry factors have added to a retailer's burdens of maintaining the productivity of these assets.

Of the three primary assets, merchandise productivity is particularly important due to the limiting effect of external and internal factors on people and space productivity (e.g., physical growth limitations and high labor costs). Merchandise productivity can be best achieved by maintaining effective mix of product in a store by product characteristic (merchandise assortments).

To achieve more effective merchandise assortments, a retailer must have a merchandise plan that provides the retailer with the ability to (1) define, source, acquire, and achieve specific target merchandise assortments for each individual store location; (2) achieve an efficient, non-disruptive flow from supply source to store; (3) maintain store assortments which achieve anticipated financial objectives; and (4) communicate effectively across all areas of the business to facilitate coordinated action and reaction.

Such an effective merchandise plan must consider all possible external and industry factors. To obtain this knowledge, a retailer must have responsive and easy access to the data associated with these factors, referred to as external and industry data, respectively. To assimilate and analyze this data, which comes from many sources and in many formats, retailers began utilizing management information systems (MIS). The primary function of the MIS department in the retail industry has been the electronic collection, storage, retrieval, and manipulation of store information. Mainframe-based systems were primarily utilized due to the large amount of store information generated. Store information includes any recordable event, such as purchasing, receiving, allocation, distribution, customer returns, merchandise transfers, merchandise markdowns, promotional markdowns, inventory, store traffic, and labor data. In contrast to the extensive collection and storage of internal data, these systems, did not typically process external data. Rather, this non-industry data was simply gathered and provided to the retailer for personal interpretation.

Since understanding of local and region level dynamics is a requisite for increased retailing productivity, retailers would essentially feed store information at the store level into massive mainframe databases for subsequent analysis to identify basic trends. However, the use of mainframes typically requires the expense of a large MIS department to process data requests. There is also an inherent delay from the time of a data request to the time of the actual execution. This structure prevented MIS systems from becoming cost effective for use by executives in making daily decisions, who are typically not computer specialists and thus rely on data requests to MIS specialists.

FIG. 1 illustrates a block diagram of a conventional MIS system architecture used in the retail industry. Referring to FIG. 1, an MIS architecture 101 captures store information (one form of internal data) and electronically flows this information (data) throughout the organization for managerial planning and control purposes.

At point of sale 104, scanners 108 and electronic registers 110 record transactions to create POS data 106. These transactions include data related to customer purchases, customer returns, merchandise transfers, merchandise markdowns, promotional markdowns, etc. POS data 106 is one form of store information 116. Store information 116 also includes other store data 112. Other store data 112 includes data related to receiving, allocation, distribution, inventory, store traffic, labor, etc. Other store data 112 is generally generated by other in-store systems.

Store information 116 is polled (electronically transferred) from point of sale 104 by headquarters, typically by modem or leased-line means 117. POS 104 represents one typical location (retail store). However, MIS architecture 101 can support multiple POS locations 104.

A data storage and retrieval facility 120 receives store information 116 using computer hardware 122 and software 124. Data storage and retrieval facility 120 stores store information 116. Store information 116 is retrieved into data analyzer 127. Data analyzer 127 shapes and analyzes store information 116 under the command of a user to produce data, in the form of reports, for use in the preparation of a managerial plan 130.

In the 1970's and 1980's, retrieval of store information 116 into data analyzer 127 and the subsequent report generation were manually or electronically generated through a custom request to MIS department personnel. More recently, in response to the need for a rapid executive interface to data for managerial plan preparation, a large industry developed in Executive Information Systems (EIS). Referring to FIG. 1, an EIS 129, which typically operates on a personal computer workstation platform, interfaces with the MIS mainframe or mid-range database in data storage and retrieval facility 120. An EIS system is a computer-based system by which information and analysis can be accessed, created, packaged and/or delivered for use on demand by users who are non-technical in background. Also, EIS systems perform specific managerial applications without extensive interaction with the user, which reduces or eliminates the need for computer software training and documentation.

In contrast to store information 116, external information 136 consists of manual reports covering such topics as economic forecasts, demographic changes, and competitive analysis. In conventional systems, external information 116 is separately made available to the user for consideration in developing managerial plan 130.

Technical improvements in speed and storage capability of personal computers (PCs) have allowed this trend towards EIS systems to take place, while most firms still maintain a mainframe or minicomputer architecture for basic POS data storage and processing. The advent of powerful mini computers, local area networks (LANs), and PC systems has resulted in many of the traditional mainframe retailing applications migrating to these new platforms.

C. The Nature of Weather Anomalies

Weather anomalies are more of a regional and local event rather than a national phenomenon in countries as geographically large as the United States. This is not to say that very anomalous weather cannot affect an entire country or continent, creating, for example, abnormally hot or cold seasons. However, these events are less frequent than regional or local aberrations. Significant precipitation and temperature deviations from normal events occur continually at time intervals in specific regions and locations throughout the United States.

Because actual daily occurrences fluctuate around the long term "normal" or "average" trend line (in meteorology, normal is typically based on a 30 year average), past historical averages can be a very poor predictor of future weather on a given day and time at any specific location. Implicitly, weather effects are already embedded in an MIS POS database, so the retailer is consciously or unconsciously using some type of historical weather as a factor in any planning approach that uses trendline forecasts based on historical POS data for a given location and time period.

D. Weather Relative to National Planning Applications

At a national level, weather is only one of several important variables driving consumer demand for a retailer's products. Several other factors are, for example, price, competition, quality, advertising exposure, and the structure of the retailer's operations (number of stores, square footage, locations, etc). Relative to the national and regional implementation of planning, the impact of all of these variables dominates trendline projections.

As described above, POS databases track sales trends of specific categories at specific locations which are then aggregated and manipulated into regional and national executive information reports. Since the impact of local weather anomalies can be diluted when aggregated to the national levels (sharp local sales fluctuations due to weather tend to average out when aggregated into national numbers), the impact of weather has not received much scrutiny relative to national planning and forecasting.

E. Weather Relative to Regional and Local Planning Applications

The impact of weather on a regional and local level is direct and dramatic. At the store level, weather is often a key driver of sales of specific product categories. Weather also influences store traffic which, in turn, often impacts sales of all goods. Weather can influence the timing and intensity of markdowns, and can create stockout situations which replenishment cycles can not address due to the inherent time lag of many replenishment approaches.

The combination of lost sales due to stockouts and markdowns required to move slow inventory are enormous hidden costs, both in terms of lost income and opportunity costs. Aggregate these costs on a national level, and weather is one of the last major areas of retailing where costs can be carved out (eliminate overstocks) and stores can improve productivity (less markdown allows for more margin within the same square footage).

In short, weather can create windows of opportunity or potential pitfalls that are completely independent events relative to economics, demographics, consumer income, and competitive issues (price, quality). The cash and opportunity costs in the aggregate are enormous.

F. Conventional Approaches Addressing Weather Impact

Though the majority of retailers acknowledge the effects of weather, many do not consider weather as a problem per se, considering it as a completely uncontrollable part of the external environment.

However, the underlying problem is essentially one of prediction of the future; i.e., developing a predictive model. All retailers must forecast (informally or formally) how much inventory to buy and distribute based on expected demand and appropriate inventory buffers. Hence, many conventional predictive modelling processes have been developed, none of which adequately address the impact of weather impact.

One conventional solution is to purposely not consider the impact of weather on retail sales. In such instances, the retailer will maintain high inventory levels and rapidly replenish the inventory as it is sold. This approach creates large working capital needs to support such a large inventory.

Another conventional solution is for the retailer to qualitatively use weather information to anticipate future demands. This procedure, if used by decision makers, is very subjective and does not evaluate weather in a predictive sense. Nor does it quantify the effect of past and future weather on consumer demands.

Another conventional approach is the utilization of climatology. Climatology is the study of the climates found on the earth. Climatology synthesizes weather elements (temperature, precipitation, wind, etc.) over a long period of time (years), resulting in characteristic weather patterns for a given area for a given time frame (weekly, monthly, seasonably, etc.). This approach does not utilize forecasted weather as a parameter, which can vary considerably from any given time period from year to year for a given area. Climatology yields only the average weather condition, and is not indicative of the weather for any specific future time frame.

Manufacturers and retailers have been known to rely on broad projections developed by the National Weather Service (the governmental entity in the USA charged with disseminating weather data to the public) and other private forecasting firms. With reference to long range projections, these may be vague, broad, and lack regional or local specificity. It is of limited use since they are issued to cover anticipated weather averaged for 30, 60, or 90 day periods covering large geographic areas. This information cannot be quantified or easily integrated into an MIS-based planning system which is geared toward a daily or weekly time increment for specific location and time.

In summary, the above conventional solutions to weather planning problems in retail all suffer from one or several deficiencies which severely limit their commercial value, by not providing: (1) regional and/or local specificity in measuring past weather impact and projecting future weather impact, (2) the daily, weekly, and monthly increment of planning and forecasting required in the retail industry, (3) ample forecast leadtime required by such planning applications as buying, advertising, promotion, distribution, financial budgeting, labor scheduling, and store traffic analysis, (4) the quantification of weather impact required for precise planning applications such as unit buying and unit distribution, financial budget forecasting, and labor scheduling, (5) reliability beyond a 3 to 5 day leadtime, (6) a predictive weather impact model, which links quantitative weather impact measurement through historical correlation, with quantitative forecasts, (7) the ability to remove historical weather effects from past retail sales for use as a baseline in sales forecasting, (8) an entirely electronic, computerized, EIS implementation for ease of data retrieval/analysis with specific functions that solve specific managerial planning applications, and (9) a graphical user interface representing a predictive model in graphs, formats, and charts immediately useful to the specific managerial applications.

What is needed is an Executive Information System (EIS) which contains a predictive model utilizing weather and other external and internal factors to provide location and time specific forecasts. The forecast must be available early enough to provide the necessary lead time for retail planners to respond to the changing factors, and must be reliable. The EIS system must interface to existing MIS systems, and must present the analysis quickly and in a form which is tailored to specific planning applications.

SUMMARY OF THE INVENTION

The present invention is a computer-based EIS system which determines the impact of weather and other external and internal factors on the retail industry. The present invention is a long-range executive weather information system (LEWIS) containing a predictive model which utilizes industry and non-industry data in its determination of the relationship between historical weather and retail sales. LEWIS determines these relationships with location specificity (for example, store level) as well as time specificity (for example, daily and weekly time increments).

The present invention utilizes a multiple regression correlation technique to generate a weather impact model which correlates weather and other variables with store information for specific locations. The weather impact model quantifies the weather impact in terms of unit or dollar sales volume or any other commercially useful benchmark.

After determining the relationship between historical weather and historical sales, LEWIS generates a normalized or deweatherized historical sales baseline utilizing normal weather and external factors. Normal weather is defined as the 30 year average of a particular weather parameter for a specific location and time.

Since the original managerial plan does not typically consider weather effects in any systematic function, a user can utilize the deweatherized data to generate a revised managerial plan. In addition, LEWIS may then be implemented to "weatherize" the revised managerial plan. That is, LEWIS utilizes the previously determined relationships and applies them to a forecasted weather to generate a weather-modified managerial plan.

A weather impact model for buying, distribution, financial budgeting, labor scheduling, advertising, promotion, and store traffic analysis applications, is used in conjunction with 1) daily and weekly weather forecasts, and 2) a managerial plan forecast for a specific time, product, and location. The resulting output represents a weather-modified plan for the above managerial planning applications. This weather modified managerial plan is manipulated by a graphic user interface (GUI) into useful charts, graphics and reports for rapid assimilation by the user.

For advertising and promotional applications, the weather impact model is used in conjunction with store information and forecasted weather data. The output identifies how products are favorably or unfavorably impacted by weather at any given location (that is, cold impact versus hot), the degree of the impact, and most importantly, the most favorable timing for advertising and promotional campaigns to take advantage of weather impact.

The present invention provides (1) regional and local specificity in measuring the impact of past weather and projecting the impact of future weather, external, and internal factors, (2) daily, weekly, and monthly increment of planning and forecasting, (3) sufficient forecast leadtime required by such planning applications as buying, advertising, promotion, distribution, financial budgeting, labor scheduling and store traffic analysis, (4) the quantification of weather impact required for precise planning applications such as unit buying and unit distribution, financial budget forecasting, and labor scheduling, store traffic, advertising, and promotion, (5) reliability beyond a 3 to 5 day leadtime, (6) a predictive weather impact model, which links quantitative weather impact measurement through historical correlation, with quantitative forecasts, (7) the ability to remove historical weather effects from past retail sales for use as a baseline in sales forecasting, (8) an entirely electronic, computerized, EIS implementation for ease of data retrieval/analysis with specific functions that solve specific managerial planning applications, and (9) a graphical user interface represents the predictive model in graphs, formats, and charts immediately useful to the specific managerial applications.

Further features and advantages of the present invention, as well as the structure and operation of various embodiments of the present invention, are described in detail below with reference to the accompanying drawings. In the drawings, like reference numbers indicate identical or functionally similar elements. Additionally, the left-most digit of a reference number identifies the drawing in which the reference number first appears.

BRIEF DESCRIPTION OF THE DRAWINGS

This invention will be better understood if reference is made to the accompanying drawings in which.

DETAILED DESCRIPTION OF THE PREFERRED EMBODIMENTS

I. General Overview

The present invention is an Executive Information System (EIS) for managerial planning applications that are impacted by weather, economics, competition, demographics, and other factors. The present invention, referred to as a Long-range Executive Weather Information System (LEWIS), calculates and displays the impact of any internal (industry) and external factors on retail sales performance. This calculation includes the modeling of the relationship between the above factors and retail information. LEWIS utilizes such a model in conjunction with long range weather forecasts to identify the future impact of the above factors on retail planning applications.

In the preferred embodiment of the present invention, LEWIS is implemented to determine the impact of various factors on the retail sales industry. However, as one of ordinary skill in the relevant art would find apparent, the present invention may be implemented to apply to any industry affected by weather. For example, the present invention may be implemented in industries such as the personal care, utilities, energy, agriculture, consumer products, insurance, transportation, outdoor events, chemicals, pharmaceutical, construction, entertainment, and travel industries.

Figure 2:
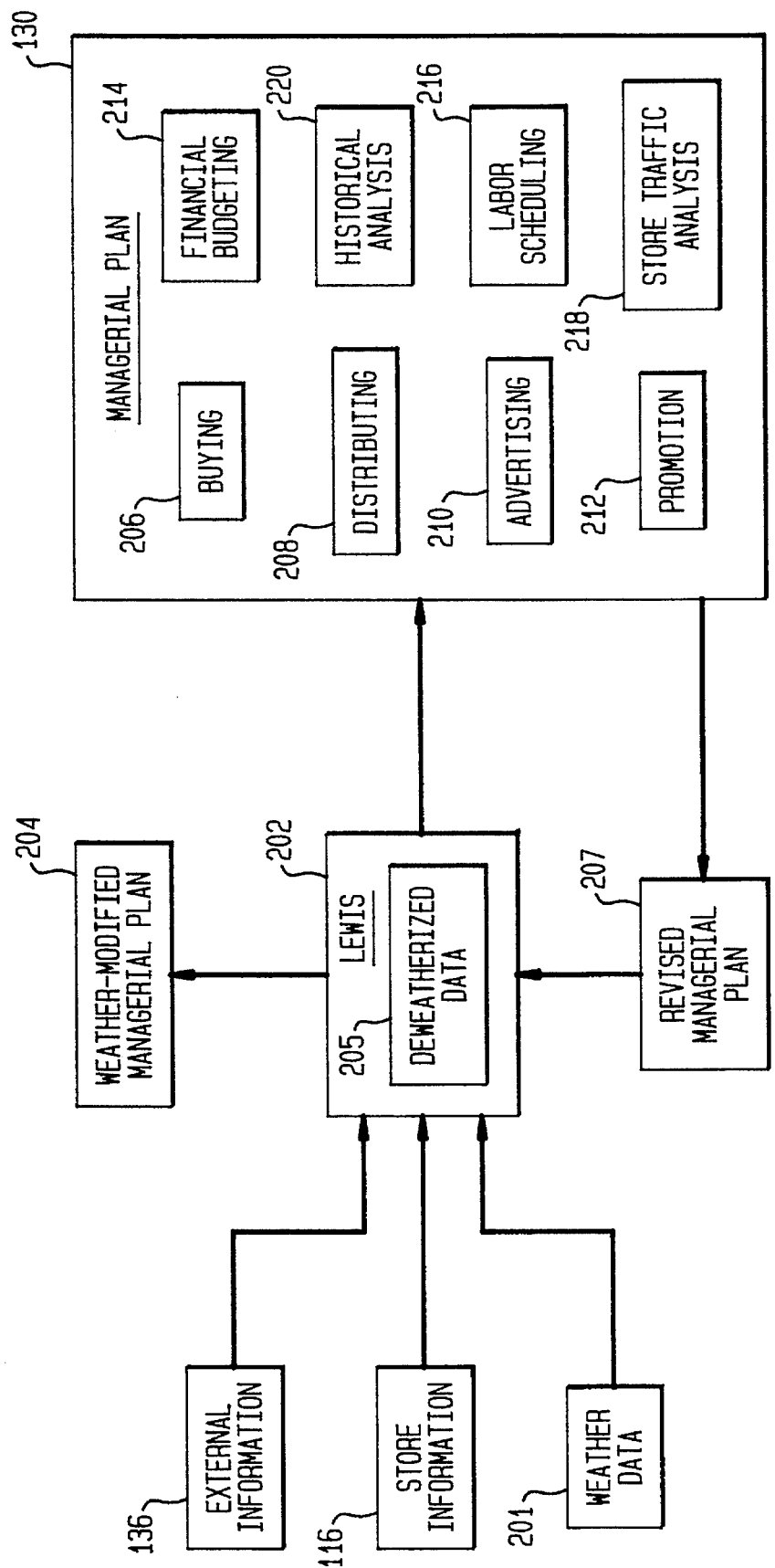
FIG. 2 is a interface block diagram showing the Long-range Executive Weather Information System (LEWIS) creating and modifying managerial plans.

FIG. 2 illustrates a block diagram of an implementation of the present invention in a retailing environment. Referring now to FIG. 2, LEWIS 202 receives as inputs external information 136, store information 116, and weather data 201. LEWIS 202 utilizes these inputs to produce deweatherized data 205. Deweatherized data 205 may be utilized by a user as a new baseline in developing managerial plan 130. In a preferred embodiment of the present invention, managerial plan 130 is any weather-impacted managerial plan or analysis which can accept the level of deweatherized data 205 produced by LEWIS 202. Examples of managerial plan 130 include buying product 206, distributing product to specific locations 208, advertising 210, promotions 212, financial budgeting 214, historical analysis 220, labor scheduling 216, and store traffic analysis 218. These applications are by way of example only; the present invention is intended to apply to any managerial application that experiences weather impact in any industry. In a preferred embodiment, a user modifies one or more portions of managerial plan 130 in light of deweatherized data 205 as part of an original planning or replanning function. The subsequent managerial plan is referred to as a revised managerial plan 207.

If a user cannot create a managerial plan which will be able to accept the level of deweatherized data generated by LEWIS 202 ("level" meaning by product, by store, and by week), deweatherized data 205 is retained in LEWIS 202 and utilized to internally generate a weather-modified managerial plan 204. For example, some retailers plan at the monthly or seasonal level, rather than at the weekly level. Such a retailer could not directly use deweatherized data 205.

The term "deweatherize" refers to the process by which LEWIS 202 utilizes a multiple regression technique (discussed below) to re-state retail data based upon normal weather and external factors. Normal weather is defined as the 30 year average of a particular weather parameter for a specific location and time. External factors impacting the retail industry include, for example, rising labor costs, increasing property costs, increased competition, economics, increasing cost of capital, increasing consumer awareness, increasing distribution costs, changing demographics and zero population growth, decreasing labor pool, and flat to diminishing per capita income. Internal (or industry) factors affecting the retail industry include, for example, large number of stores (decentralization), homogeneity amongst retailers, continuous price promotion (equates to decreased gross margin dollars), decreasing customer loyalty, minimal customer service, physical growth limitations, and large quantities of specific retailer store information.

Figure 3:
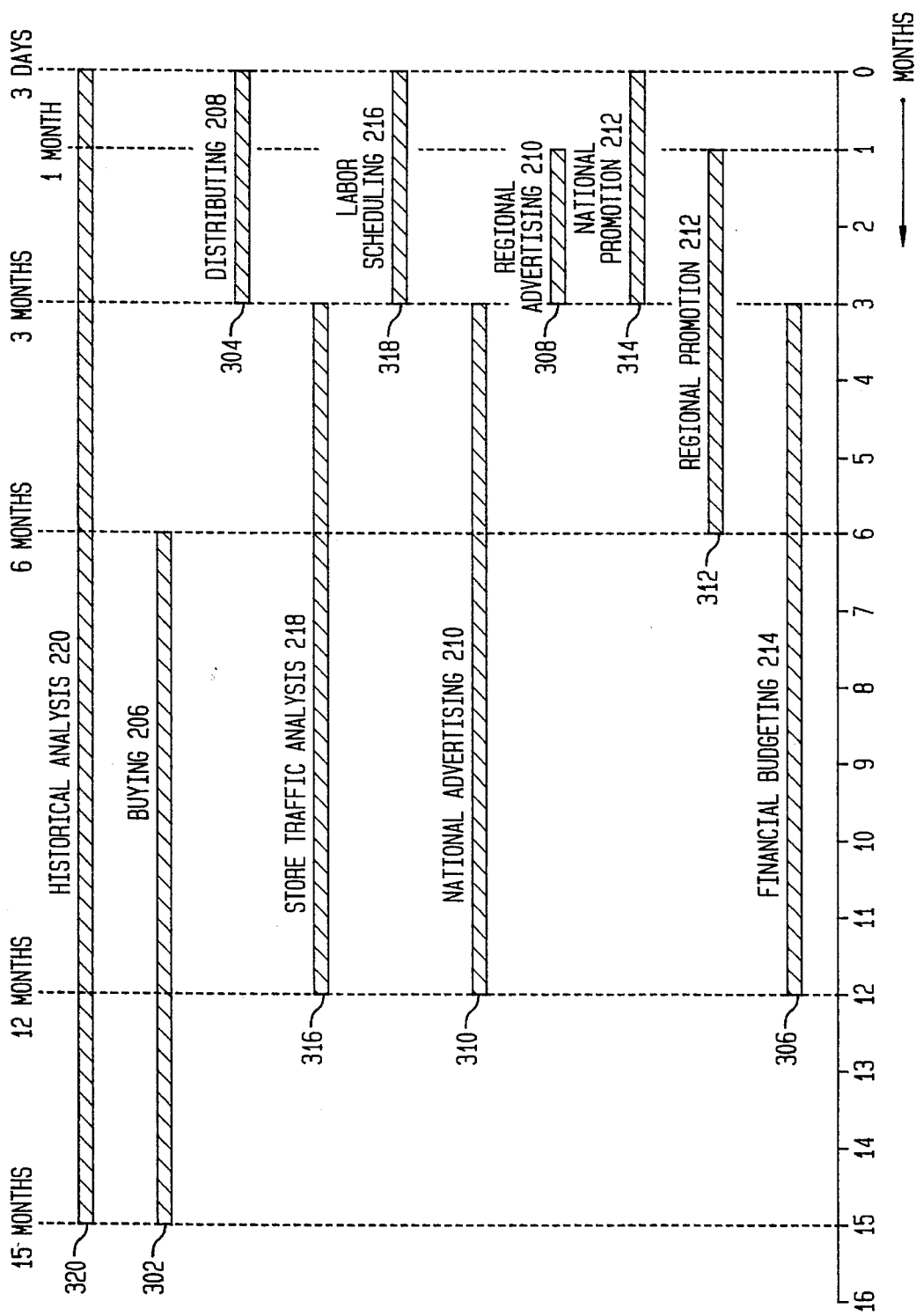
FIG. 3 is a timeline illustrating the leadtime required to execute specific elements of a managerial plan.

FIG. 3 illustrates the typical leadtimes required to execute specific elements of a managerial plan in a large retailer environment. Inherent in the concept of managerial planning is a leadtime associated with specific activities which must be conducted in an organized fashion.

The maximum and minimum leadtimes for the functions depicted in managerial plan 130 are illustrated according to the time they have to be performed relative to the implementation date of the managerial plan. The duration of the leadtimes illustrated in FIG. 3 are those in which the planning activity is to occur to have commercial value.

Buying 206 has a typical leadtime 302 of 6 to 15 months. Distributing 208 has a typical leadtime 304 of 1 week to 3 months. Financial budgeting 214 has a typical leadtime 306 of 3 to 12 months. Advertising 210 and promotion 212 applications are conducted at different levels of retailing such as regional and national levels. As a result, the leadtime required to implement these applications varies according to the targeted level. For example, regional advertising requires a leadtime 308 of 1 to 3 months, while national advertising requires a leadtime 310 of 3 to 12 months. Regional promotion requires a leadtime 312 of 3 days to 3 months, while national promotions require a leadtime 314 of 1 to 6 months. Store traffic analysis 218 has a leadtime 316 of 3 days to 12 months, and labor scheduling 216 has a leadtime 318 from 3 days to 3 months. Historical Analysis 220 is performed on an on-going basis and thus is shown to have a continual leadtime 320.

II. MIS Architecture Implementing The Present Invention

Figure 1:
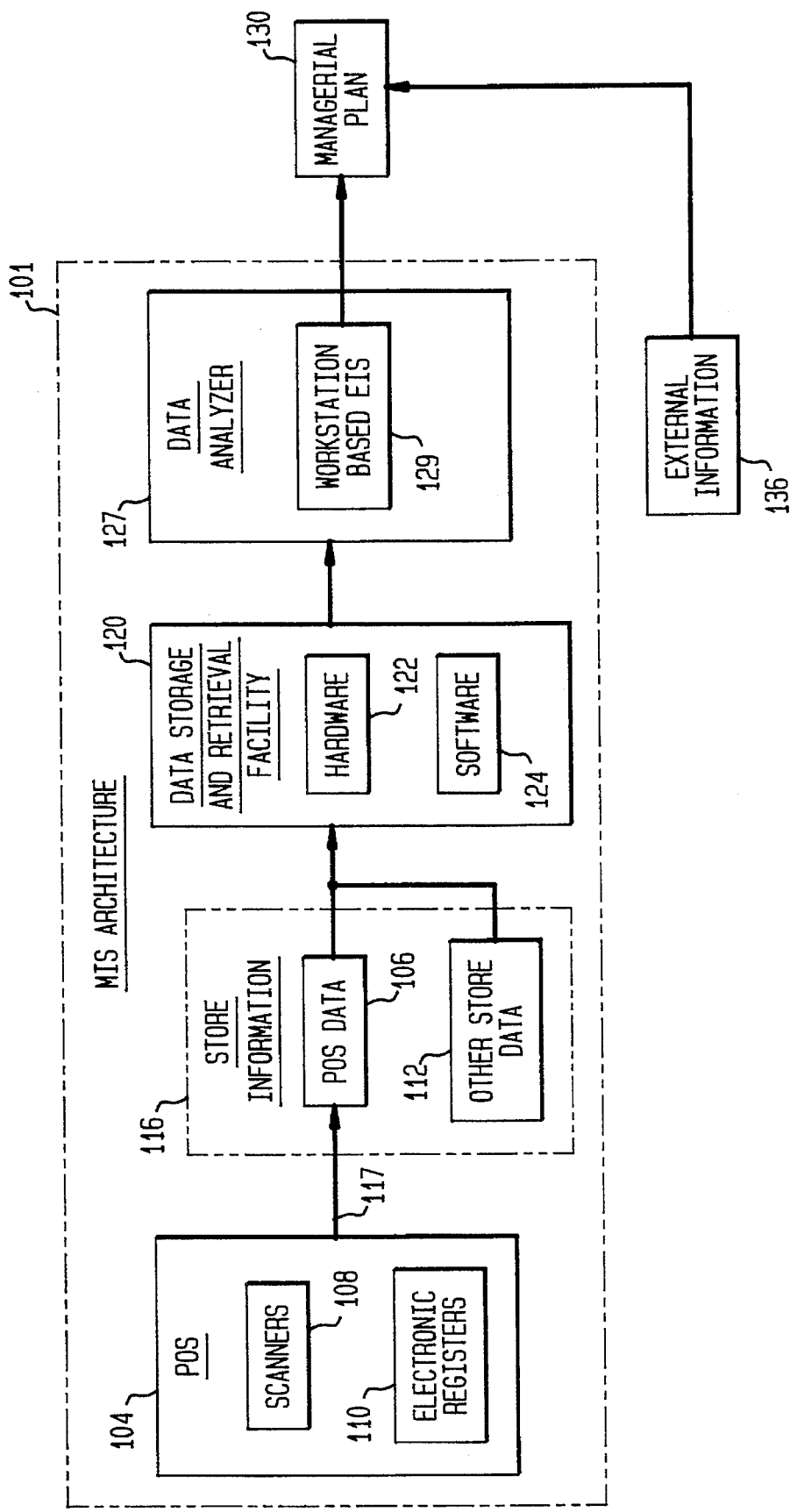
FIG. 1 is a block diagram of a typical management information system (MIS) architecture.
Figure 4:
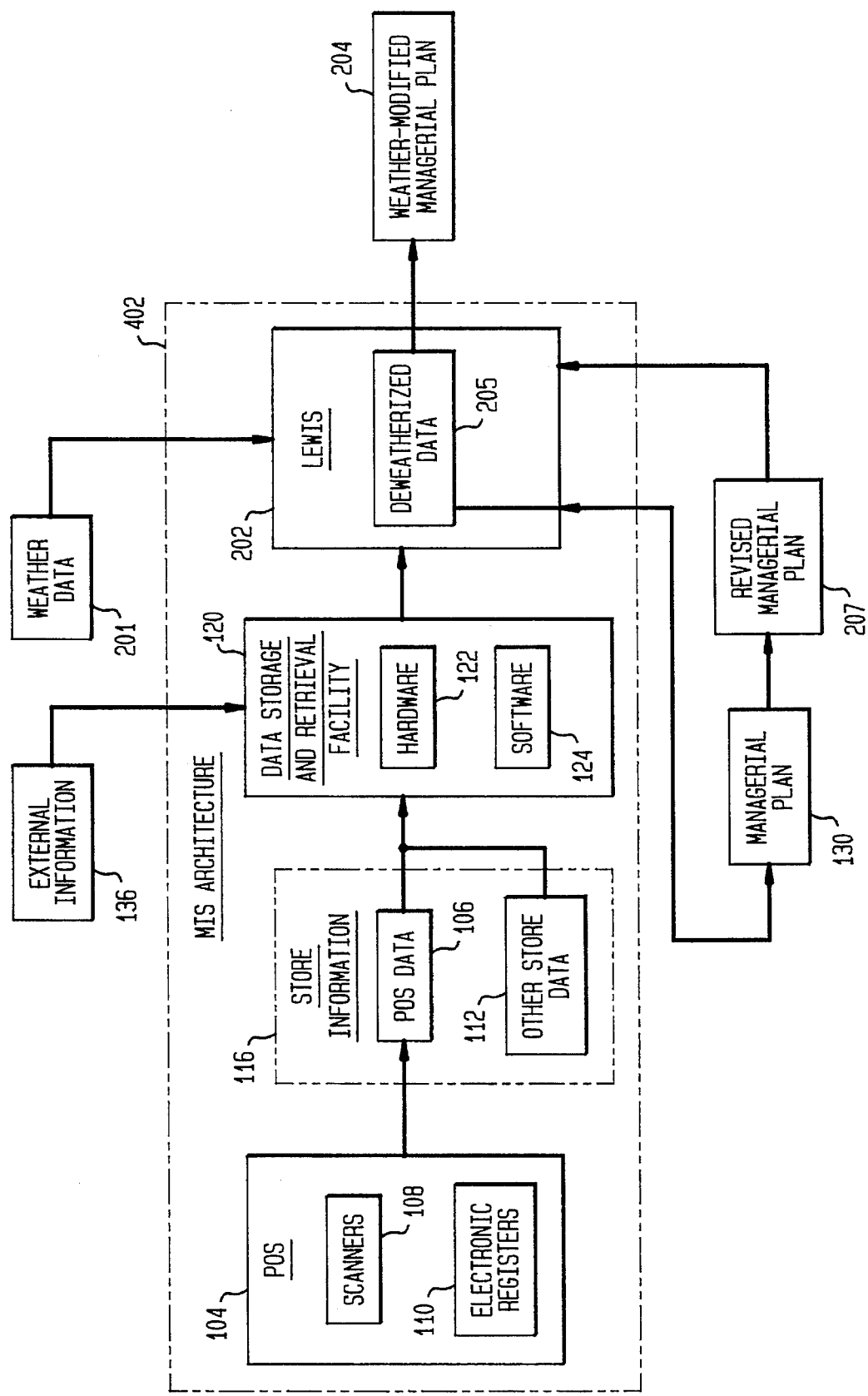
FIG. 4 is a block diagram showing an MIS system containing the LEWIS system of the present invention.

FIG. 4 illustrates a block diagram of a typical MIS system in which the present invention is implemented. Referring to FIG. 4, LEWIS 202 is resident within a computer-based MIS architecture 402. MIS architecture 402 captures store information 116 and external information 136 to electronically transmit this information throughout an organization for managerial planning and control purposes in a manner similar to that described with reference to FIG. 1.

Retailers sell product to consumers through one or more store locations 104 generating store information 116. Also note that the present invention is applicable to one or more locations, metropolitan statistical areas, or regions. At point of sale 104, electronic scanners 108, registers 110, and other electronic scanning and data gathering devices generate POS data 106. Other store data 112, which is also considered store information 116, includes any type of recordable event taking place in support of consumer sales (that is, inventory transfer from distribution center to store, promotion data, store traffic, labor data, etc). Other store data 112 specifically does not include events containing information regarding the time, amount, and merchandise of a specific sale. Thus, any type of store information 116 in support of consumer sales activities is collected and flows through MIS architecture 402 to LEWIS 202.

Also available to the retailer is external information 136. External information 136 can be economic, demographic, competitive, or any other information that the retailer believes is of value to assessing his business performance. External information 136 is typically available via on-line data services or from external database sources. The data storage and retrieval facility 120 receives external information 136 and store information 116 using computer hardware 122 and software 124. Depending on the MIS age, scope and type of data, and retailer resources, the data storage and retrieval facility 120 can be a mainframe computer, mid-range computer or Personal Computer (PC) network configuration. For the largest retailers, mainframe storage is preferable. However, as one of ordinary skill the relevant art would find apparent, the present invention may be implemented in any computer platform or architecture presently available or developed in the future.

In the preferred embodiment of the present invention, LEWIS 202 retrieves the appropriate information from data storage and retrieval facility 120 and receives weather data 201 to generate deweatherized data 205 which, used in conjunction with managerial plan 130, produces a revised managerial plan 207. In addition, revised managerial plan 207 can be input into LEWIS 202 to be "weatherized." The term "weatherize" refers to the process by which one utilizes the present invention with forecasted weather and other factors to forecast retail sales. The forecasted weather is commercially available from Strategic Weather Services, Wayne, Pa.

Hence, the workstation or LAN-based LEWIS 202 implemented within the retailer's MIS architecture 102 receives store information 116, external information 136, and weather data 201 as inputs for analysis. The result of the weatherization yields a weather-modified managerial plan 204.

In the preferred embodiment of present invention, the LEWIS system 202 is a computer-based Executive Information System (EIS) residing on a PC workstation or LAN having, for example, a model 80486 processor (Intel, Sunnyvale, Calif., USA). However, as one of ordinary skill in the art would find apparent, LEWIS 202 may reside within any computer-based system, including mid-range or mainframe MIS architectures.

Figure 5:
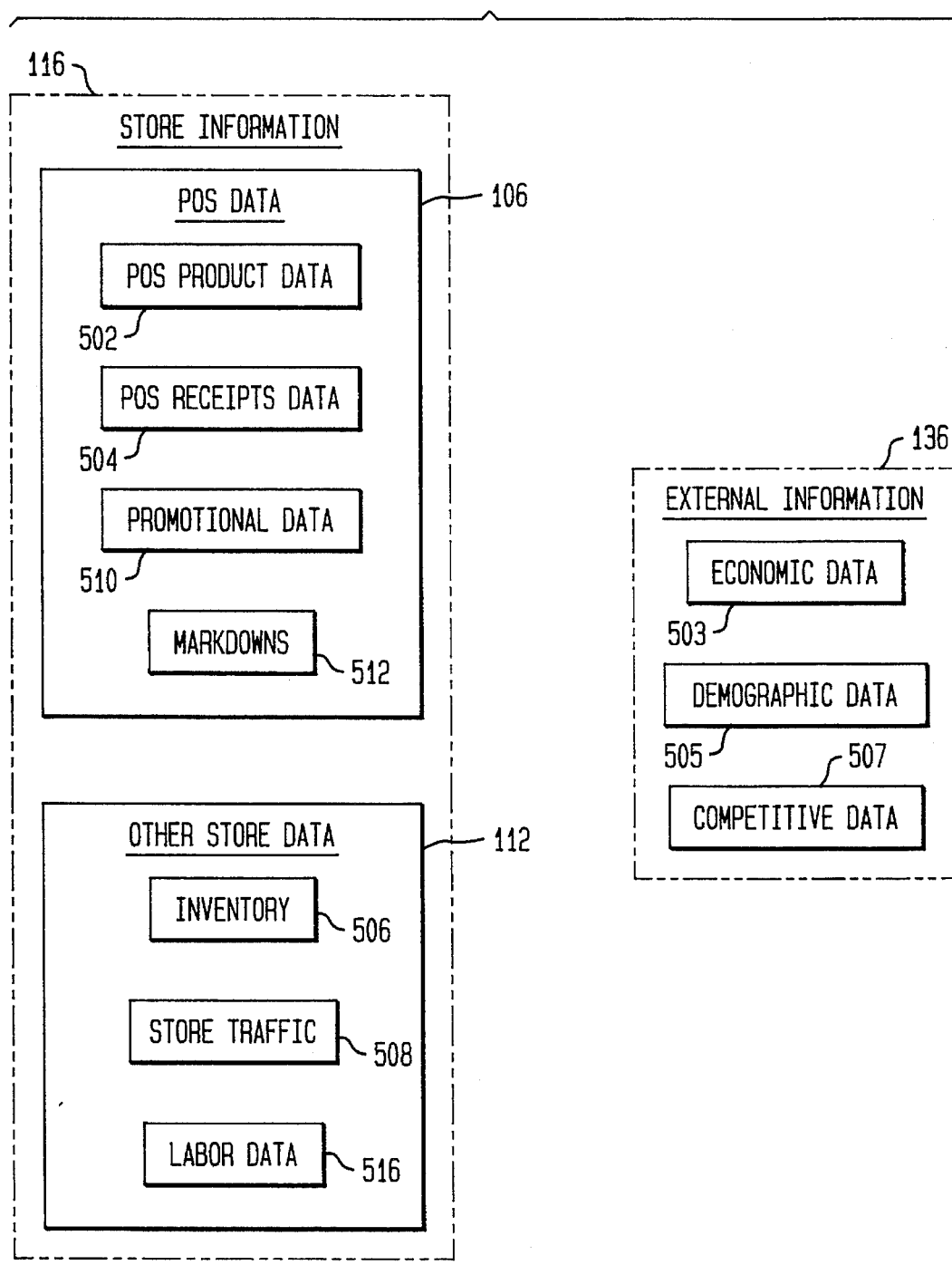
FIG. 5 illustrates some types of store and external information.

FIG. 5 illustrates, in block diagram form, the store information 116 and external information 136 which are considered in the preferred embodiment of LEWIS 202. The various categories of store information 116 include POS data 106 and other store data 112. POS data 106 includes product data 502, POS receipt data 504, promotional data 510, markdown data 12. Other store data 112 includes inventory data 506, store traffic data 508 and employee labor data 516. The various categories of external information 136 include economic data 503, demographic data 505, and competitive data 507, These categories of store information 116 and external information 136 are by way of example only, and the present invention contemplates any type of store, external, or other data collected in the course of an enterprise which experiences weather impact and can be analyzed to discern commercially valuable analysis for planning purposes. In industries other than retailing, the present invention contemplates any data collected in the course of operating an enterprise which is necessary for and valuable to the activity of planning, including but not limited to Uniform Product Code (UPC) data, shipments to distributors, dealer channel data, financial market data, labor scheduling data and store traffic data.

Figure 6:
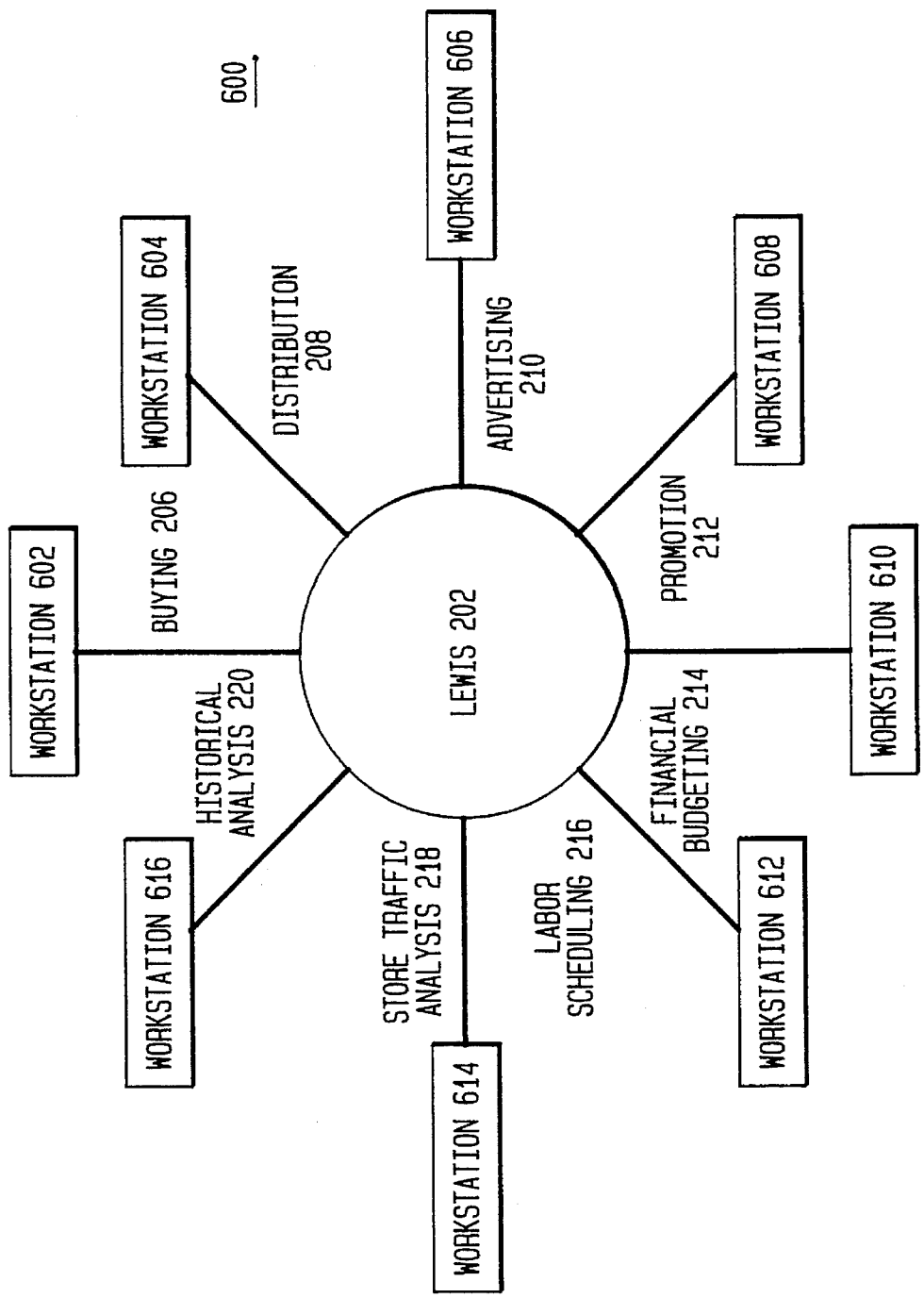
FIG. 6 is a block diagram a local area network containing workstations performing managerial planning functions utilizing LEWIS.

Referring to FIG. 6, the preferred embodiment of LEWIS 202 residing on a LAN is illustrated. In the configuration shown in FIG. 6, LEWIS 202 resides on LAN 600 whereby all applications have access to LEWIS 202. In the more advanced MIS systems, data analyzer 406 allows electronic transfer of managerial plans between planning applications residing on the same or different workstation. For example, workstation 602 may be used to perform the buying application 206 portion of the managerial plan 130. Likewise, workstation 604 is used to perform the distribution 208 portion of managerial plan 130. Workstation 606 is used to perform the advertising 210 portion. Workstation 608 is used to promotion 212 portion. Workstation 610 is used to perform the financial budgeting 214 portion. Workstation 612 is used to perform the labor scheduling 216 portion, and workstation 614 is used to perform store traffic analysis portion 218 of managerial plan 130. Workstation 616 is used to perform the historical analysis 220 portion of managerial plan 130.

Figure 7:
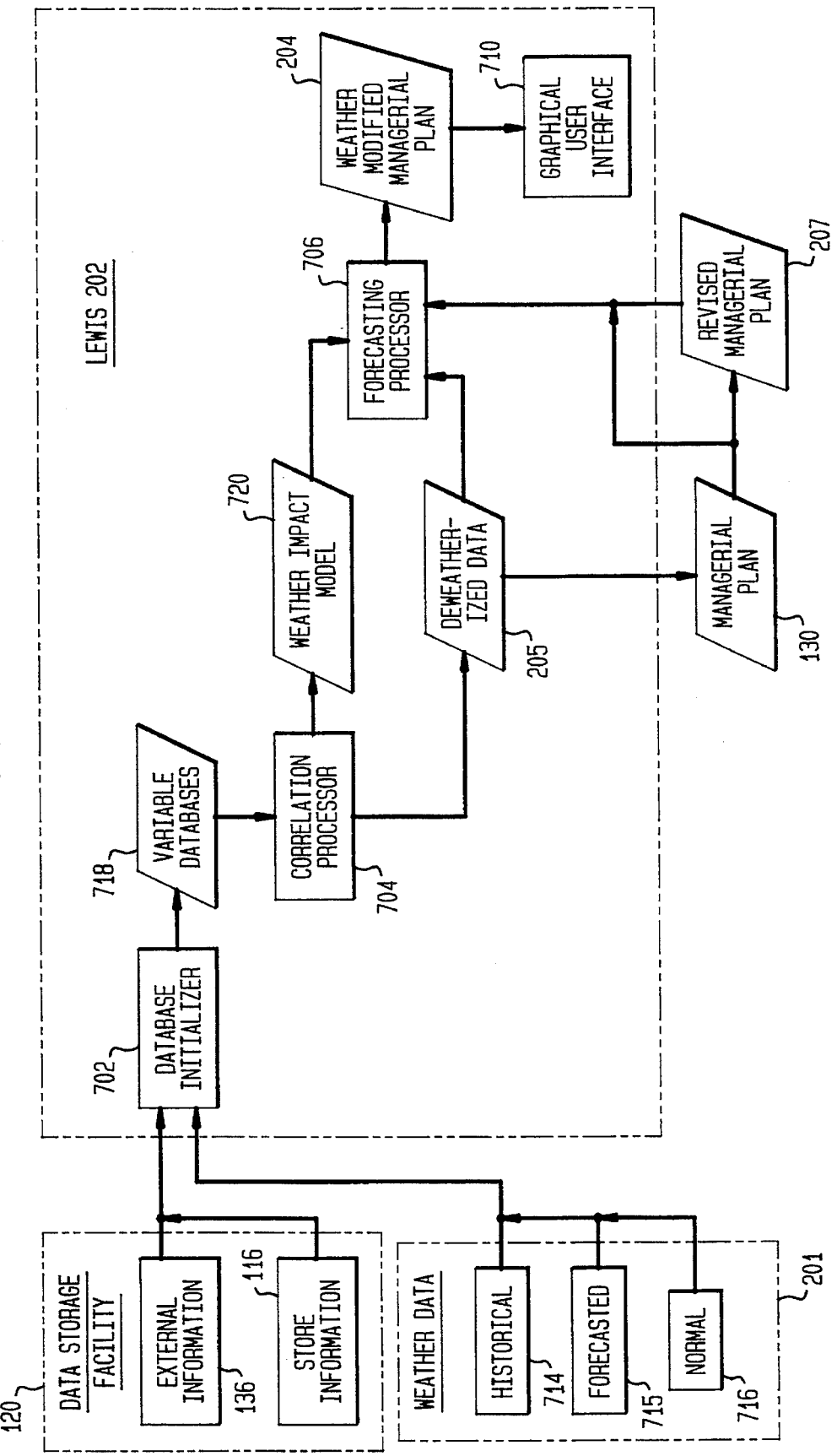
FIG. 7 is a block diagram illustrating the data flow and analytical process of LEWIS.

Referring to FIG. 7, a block diagram of the data flow and analytical processes resident within the LEWIS system 202 is illustrated. In FIG. 7, LEWIS 202 includes a database initializer 702, a correlation processor 704, a forecasting processor 706, and a graphical user interface (GUI) 710, described in detail below.

As described above, LEWIS system 202 interfaces with the retailer's MIS data storage and retrieval system 120 to receive the store and external information illustrated in FIG. 5. Depending on the structure of the data fields residing in data storage and retrieval facility 120, LEWIS 202 may require the data to be aggregated or manipulated. For example, aggregating daily sales history into weekly figures which would typically be done by the retailer. This function is typically performed prior to being input into LEWIS 202.

Weather data 201 includes historical weather data 714, forecasted weather data 715 and normal weather data 716. Weather data 701 is typically measured by any time increment necessary, for example: day, week, month. Weather data 201 can be any parameter of temperature, precipitation, humidity and other common meteorological factor.

Forecasted weather data 715 is defined as predicted weather in time increments for specific locations from 3 days to 15 months in the future. Forecasted weather data 715 is commercially available from Strategic Weather Services, Wayne, Pa., U.S.A. Historical weather data 714 is defined as actual weather observations in time increments for specific locations. Normal weather 716 is defined as the 30 year average of any weather parameter.

The database initializer 702 prepares store information 116 and external information 136 received from data storage and retrieval facility 120, and places this data into databases using mathematical relationships (discussed below). The database initializer 702 transforms the datasets into the proper form for the correlation processor 704. The database initializer 702 will accommodate client-specific hierarchies of products and locations and will also perform location-to-MSA mapping functions. Data storage and retrieval facility 120 stores the store information in an appropriate format for use by LEWIS 202 without aggregation or manipulation.

In the preferred embodiment of the present invention, historical store information 116 and external store information 136 are correlated with historical weather data 714. The correlation processor 704 produces the deweatherized data 205 based upon substituting normal weather data 716 into the weather impact model 720. The deweatherized data 205 is used as a baseline input to the managerial plan 130, thereby providing the retailer with the capability to produce a revised managerial plan 207 to be used as input to the forecasting processor 706. Alternatively, the retailer can choose to use his existing managerial plan 130 as input to the forecasting process source 706 without utilizing deweatherized data 205.

The forecasting processor 706 applies the forecasted weather data 715 to the weather impact model 720 in conjunction with the revised plan 207 or in conjunction with the deweatherized data 205, whichever is appropriate, based upon the level of "sophistication" for each retailer. The term sophistication relates to the ability of the retailer to produce daily and/or weekly product plans by store location. The forecasting processor 706 then produces a weather-modified managerial plan 204 based upon substitution of forecasted weather information 715 and external information 136 into the weather impact model 720. The forecasting processor 706 quantitatively modifies a forecast from a managerial plan 130, or a revised plan 207, or the deweatherized data 205 and generates relative comparisons of weather impact on specific products at specific locations and times.

GUI 710 then receives the weather-modified managerial plan 204 from the forecasting processor 706.

III. Database Initializer

Figure 8:
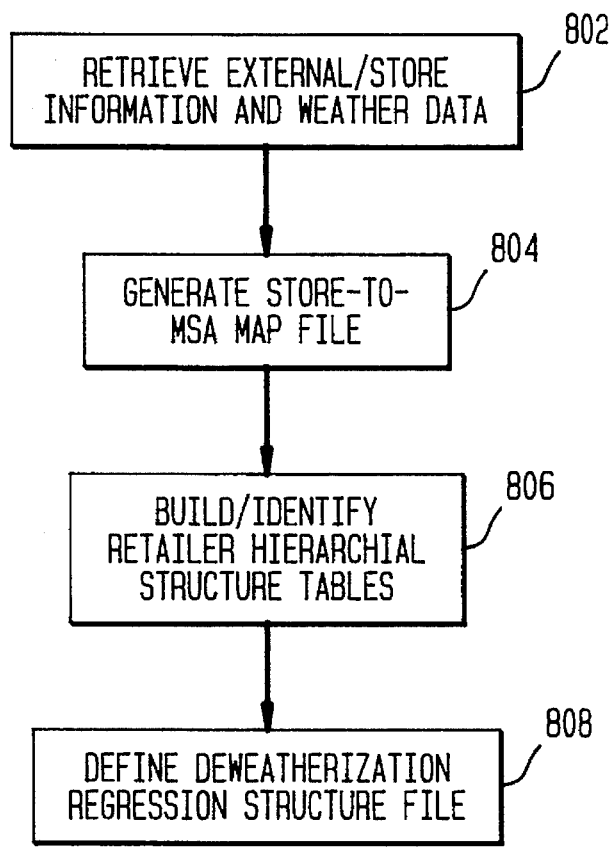
FIG. 8 is a flowchart of the functions performed by the database initializer.

FIG. 8 is a flow chart illustrating the processing steps which are performed by the database initializer 702 in a preferred embodiment of the present invention.

First, in step 802, database initializer 702 retrieves external information 136 and store information 116 (generally referred to as client data), from data storage and retrieval facility 120. Weather data 201 is also input into database initializer 702. Weather data 201 includes historical weather data 714, forecasted weather data 715, and normal weather data 716. In the preferred embodiment, weather data 201 is made available when LEWIS 202 is installed on LAN 600. The data retrieved by database initializer 702 is determined by the functions and time periods selected by the user via GUI 710.

In step 804, database initializer 702 maps store locations to metropolitan statistical areas (MSAs). This mapping function enables database initializer 702 to determine what portion of weather data 201 is required based upon the store information 116 provided. By mapping store location zip codes to MSAs, database initializer 702 then utilizes only that portion of weather data 201 which is associated with those MSAs in which stores are located.

Next, in step 806, database initializer 702 facilitates the identification/building of retailer hierarchial structure tables. Hierarchial structural tables indicate the parent-child relationship between retailer items and the respective levels above them. For example, bras are a child of women's lingerie which is a child of women's division which is a child of apparel, etc. The database initializer 702 can consolidate the items in any manner desired by the user depending on the form of the hierarchial structural tables. Alternative consolidations wherein the user aggregates the information in a particular combination of products, levels, and store locations are also possible.

In step 808, database initializer 702 generates a deweatherization regression structure file. The deweatherization regression structure file defines how LEWIS will build the weather impact model via multiple regression techniques. The deweatherization regression structure file is comprised of four sections: (1) regress columns which indicate how LEWIS will sample specific historical periods; (2) regression variables which indicate how the variable database historical value is mapped into weather impact 720; (3) normal variables which indicate how the variable data base normal values map into weather impact model 720; (4) variable mappings which indicates what the output of the weather impact model will be named. Each of these are discussed below.

The first section of the deweatherization regression structure file, regress columns, is the sampling of specific historical periods. Building weather impact model 720 requires that associations be made between similar historical observations of weather and sales and other external data. In order to associate the dates from store information 116 and weather data 201, store information 116 is offset into weather data file by a certain number of periods. Database initializer 702 receives this number of periods from the user to move the stored information 116 to achieve this alignment.

Also, the specific periods to be sampled from both, historical weather data 714 and the historical sales data (store information) 116 are also received from the user. In the preferred embodiment, there is typically at least two year's quantity of data required.

The second section of the deweatherization regression structure file, regress variables, contains the mappings of historical values from variable databases 718 into weather impact model 720. To perform this mapping function, the historical values to be used by weather impact model 720 are identified, including the transformations of those variables. These variables are present in sales information 116 and/or the weather data 201.

The following "x" variables come from weather data 201, (history, normal, and forecast), and sales information 116 stored in data storage and retrieval facility 120.

In the preferred embodiment of the present invention, weather impact model 720 contains nine independent variables (discussed below). The first independent variable, xTEMP, is shown below.

$$xTEMP=TEMP-LAG(TEMP,1)$$

This independent variable shows how LEWIS derives the first variable as a difference from the current value, TEMP, and the previous value, LAG(TEMP,1). This definition continues through the remaining independent variables, which are indicated by the "x" in the front of them. The function "LAG(XX,n)" refers to the lagging of the data XX by n periods. The function "HAVERAGE(XX)" refers to deriving the shape of an historical average of the XX variable. The function "TAVERAGE(XX)" refers to deriving an average of the variable XX.

$$xTEMP(-1)=LAG(TEMP-LAG(TEMP,1),1)$$

$$xTEMP(-2)=LAG(TEMP-LAG(TEMP,1),2)$$

$$xPREC=PREC-LAG(PREC,1)$$

$$xPREC(-1)=LAG(PREC-LAG(PREC,1),1)$$

$$xPREC(-2)=LAG(PREC-LAG(PREC,1),2)$$

$$xPROMO=PRO.UNIT$$

$$xPROMO(-2)=LAG(PRO.UNIT,2)$$

$$xTOT.UNIT=HAVERAGE(TOT.UNIT)$$

$$Y=TOT.UNIT/TAVERAGE(TOT.UNIT)$$

Y is the dependent variable, retail sales, which LEWIS is modeling. The definition of this variable describes the "shape" of sales instead of the actual sales value. This shape of sales is derived by taking the actual sales value and dividing by the average sales for the entire season. For example, if the season was 3 periods long, and the actual sales values were 2, 4, and 6, the average for the season would be 4. The shape of sales would be 2/4, 4/4, 6/4, or 0.5,1,1.5.

The next section of the deweatherization regression structure file, normal variables, substitutes normal weather values in place of actual weather values that were used in the regress variables section. The following is a list of the substituted normal weather values:

$$xTEMP=TEMP.SEA-LAG(TEMP.SEA,1)$$

$$xTEMP(-1)=LAG(TEMP.SEA-LAG(TEMP.SEA,1),1)$$

$$xTEMP(-2)=LAG(TEMP.SEA-LAG(TEMP.SEA,1),2)$$

$$xPREC=PREC.SEA-LAG(PREC.SEA,1)$$

$$xPREC(-1)=LAG(PREC.SEA-LAG(PREC.SEA,1),1)$$

$$xPREC(-2)=LAG(PREC.SEA-LAG(PREC.SEA,1),2)$$

$$xPROMO=PRO.UNIT$$

$$xPROMO(-2)=LAG(PRO.UNIT,2)$$

$$xTOT.UNIT=HAVERAGE(TOT.UNIT)$$

$$zDE-WEATH=TAVERAGE(TOT.UNIT)*RY$$

The line "zDE–WEATH=TAVERAGE(TOT. UNIT)*RY" shows that the output of substituting normal weather into the equation generates a new shape of sales (RY from above), i.e., a deweatherized shape of sales. This shape is subsequently scaled back into units or dollars by multiplying it by the seasonal average which is derived as TAVERAGE(TOT.UNIT).

The next section of the deweatherization regression structure file, variable mappings, labels the deweatherization output variables. This is shown as:

variable mappings r, LY.SLS=TOT.UNIT r, TOT.UNIT=RY[TOT.UNIT]

The code "r" tells the output procedure that the codes following are only to pertain to the historical sections of the file. The code "LY.SLS =TOT. UNIT" refers to last year's actual sales. The code "TOT.UNIT=RY[TOT.UNIT]" refers to the deweatherized data (last year's sales deweatherized).

These outputs will be placed into a comma-separated file in the form of product, location, variable, time$_1$ ... time$_N$, i.e., time is the across subscript dimension(same as the input files). This output file will be the deweatherized data 205, meaning that it will show the last year actual sales results and the deweatherized data results for each (product x location) combination that was run through the weather impact model 720.

IV. Correlation Processor

Figure 9:
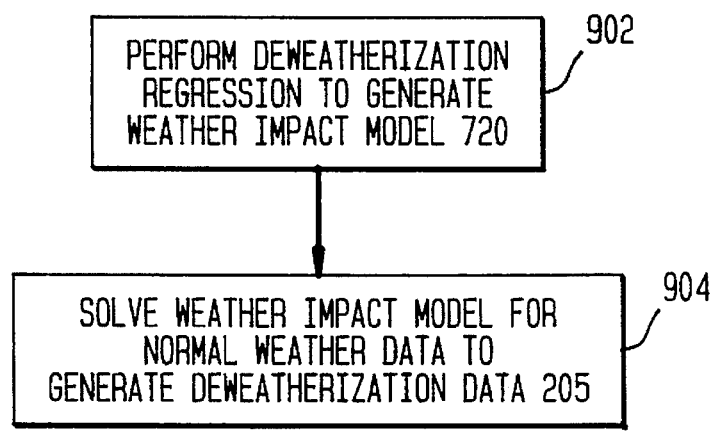
FIG. 9 is a block diagram of the functions performed by the correlation processor.

FIG. 9 is a flowchart illustrating the steps performed by correlation processor 704. Referring to FIG. 9, in step 902 correlation processor 704 generates the weather impact model based upon the deweatherization regression structure file defined in step 808. The weather impact model utilizes a multiple regression technique which is well known to one of ordinary skill in the art.

The weather impact model 720 is a multiple regression model with "k" variables. This model is based on the assumption that there is a correlation (i.e., a statistically significant relationship) between the change in weather (i.e., temperature and precipitation), and the change in sales. Multiple regression is the statistical technique employed by the correlation processor 704 to quantify these relationships, and to turn them into a usable equation, referred to as the weather impact model. The deweatherization regression model also considers other variables which are not strictly weather-based to more accurately define the observed changes in retail sales. These include the external and internal factors discussed above.

The general form of the deweatherization regression model which provides the "best fit" to the observed retail sales data values is shown below.

$$Y = \beta_1 + \beta_2 X_2 + \beta_3 X_3 + \ldots + \beta_L X_L$$

wherein,

Y=dependent variable; change in sales $X_2 \ldots X_k$ =independent variables; changes in weather, external and internal factors $B_1 \ldots B_k$=regression coefficients Weather impact model 720 is essentially this equation with the values of the coefficients determined, since these coefficients identify the effect of weather on the dependent variables (retail sales).

There are a variety of techniques which can be employed to determine the regression coefficients. These techniques are considered to be obvious to one of ordinary skill in the relevant art. A more detailed description of the statistical methods employed to determine regression coefficients may be found in "Econometric Models and Economic Forecasts," authored by R. S. Pindyck and D. I. Rubinfeld, the relevant portions of which are herein incorporated by reference.

The determination of variable transformations, which determines how variables are to be used within the regression equation, is critical to the successful execution and use of the regression equation. Therefore, the variable transformations in an equation structure are shown above. These transformations are generated by database initializer 702.

The regression model has k+1 variables—a dependent variable, and k independent variables (which includes a constant, shown as $B_1$ in the equation above). There are also N observations. We can summarize the regression model by writing a series of equations, as follows:

$$Y_1 = \beta_1 + \beta_2 X_{21} + \beta_3 X_{31} + \beta_4 X_{41} + \ldots + \beta_k X_{k1} + \epsilon_1$$

$$Y_2 = \beta_1 + \beta_2 X_{23} + \beta_3 X_{32} + \beta_4 X_{42} + \ldots + \beta_k X_{k2} \epsilon_2$$

$$\ldots = \ldots + \ldots + \ldots + \ldots + \ldots + \ldots + \ldots$$

$$Y_N = \beta_1 + \beta_2 X_{2N} + \beta_3 X_{3N} + \beta_4 X_{4N} + \ldots + \beta_k X_{kN} + \epsilon_N$$

The corresponding matrix formulation of the model is:

$$Y = X\beta + \epsilon$$

in which $$Y = \begin{bmatrix} Y_1 \\ Y_2 \\ \ldots \\ Y_N \end{bmatrix}$$

$$X = \begin{bmatrix} 1 & X_{21} & \ldots & X_{k1} \\ 1 & X_{22} & \ldots & X_{k2} \\ \ldots & \ldots & \ldots & \ldots \\ 1 & X_{2N} & \ldots & X_{kN} \end{bmatrix}$$

$$\beta = \begin{bmatrix} \beta_1 \\ \beta_2 \\ \ldots \\ \beta_k \end{bmatrix}$$

$$\epsilon = \begin{bmatrix} \epsilon_1 \\ \epsilon_2 \\ \ldots \\ \epsilon_N \end{bmatrix}$$

where

Y=Nx1 column vector of dependent variable observations

X=Nxk matrix of independent variable observations

β=kx1 column vector of unknown parameters

ε=Nx1 column vector of errors

The technique for solving the deweatherization regression equation using matrix manipulation is:

$$\beta = (X'X)^{-1}(X'Y)$$

Given the two matrices, X of order m x n and Y of order n x p:

$$X = \begin{bmatrix} X_{11} & X_{12} & \ldots & X_{1\alpha} \\ X_{21} & X_{22} & \ldots & X_{2\alpha} \\ \ldots & \ldots & \ldots & \ldots \\ X_{m1} & X_{m2} & \ldots & X_{m\alpha} \end{bmatrix}$$

and $$Y = \begin{bmatrix} Y_{11} & Y_{12} & \ldots & Y_{1p} \\ Y_{21} & Y_{22} & \ldots & Y_{2p} \\ \ldots & \ldots & \ldots & \ldots \\ Y_{n1} & Y_{n2} & \ldots & Y_{np} \end{bmatrix}$$

the result of the multiplication is:

$$XY = \begin{bmatrix} X_{11}Y_{11} + X_{12}Y_{21} + \ldots + X_{1\alpha}Y_{1\alpha} & X_{11}Y_{12} + X_{12}Y_{22} + \ldots + X_{2\alpha}Y_{\alpha 2} & \ldots & X_{11}Y_{1p} + X_{12}Y_{2p} + \ldots + X_{1\alpha}Y_{\alpha p} \\ X_{21}Y_{11} + X_{22}Y_{21} + \ldots + X_{2\alpha}Y_{\alpha 1} & X_{21}Y_{12} + X_{22}Y_{22} + \ldots + X_{2\alpha}Y_{\alpha 2} & \ldots & X_{21}Y_{1p} + X_{22}Y_{2p} + \ldots + X_{2\alpha}Y_{\alpha p} \\ \ldots & \ldots & \ldots & \ldots \\ X_{\alpha 1}Y_{11} + X_{\alpha 2}Y_{21} + \ldots + X_{\alpha n}Y_{\alpha 1} & XnlY_{12} + X_{N2}Y_{22} + \ldots + X_{\alpha n}Y_{\alpha 2} & \ldots & X_{n1}Y_{1p} + X_{n2}Y_{2p} + \ldots + X_{pn}Y_{np} \end{bmatrix}$$

or $$XY = \begin{bmatrix} \sum_{i=1}^{n} X_{1\alpha}Y_{\alpha 1} & \sum_{i=1}^{n} X_{2n}Y_{n2} & \ldots & \sum_{i=1}^{n} X_{2\alpha}Y_{np} \\ \sum_{i=1}^{n} X_{2\alpha}Y_{n1} & \sum_{i=1}^{n} X_{2n}Y_{n2} & \ldots & \sum_{i=1}^{n} X_{2\alpha}Y_{np} \\ \ldots & \ldots & \ldots & \ldots \\ \sum_{i=1}^{n} X_{m\alpha}Y_{n1} & \sum_{i=1}^{n} X_{m\alpha}Y_{n2} & \ldots & \sum_{i=1}^{n} X_{mn}Y_{np} \end{bmatrix}$$

or even $$xy_{ij} = \sum_{i=1}^{N} X_{in}Y_{nj}$$

that is, the calculation for the cell in row i column j of the result matrix, is the sum, for all n, of the products of the nth cell in row i of X with the nth cell of column j of Y.

There are a number of different approaches to inverting a matrix. In the preferred embodiment of the present invention, the technique used may be shown as:

$$XX^{-1} = \frac{adj(X)}{|X|}$$

Here the adjoint of a matrix X (designated Adj(X)) is divided by the determinant of X (designated X). The determinant of any matrix is a single value, the adjoint of a matrix is another matrix of the same order as the original matrix. Dividing a matrix by a single value is simply dividing each cell of that matrix by the single value.

To calculate the adjoint of a matrix, the determinant of a matrix must be determined. This is achieved by implementing a recursive procedure which is well known to one of ordinary skill in the art.

The sign for any cell as $(-1)^{(i+j)}$. The signed minor $(-1)^{(i+j)} |M_{ij}|$ (where Mij is the matrix which remains when row i and column j is removed) is referred to as the cofactor of the cell and is denoted by $\alpha_{ij}$. We can therefore write the calculation of the determinant as:

$$|X| = \sum_{n=i}^{N} X_{in}\alpha_{nj}$$

The adjunct matrix for a Matrix X of order n is calculated as:

$$Adj(X) = \begin{bmatrix} \alpha_{11} & \alpha_{21} & \ldots & \alpha_{n1} \\ \alpha_{12} & \alpha_{22} & \ldots & \alpha_{n2} \\ \ldots & \ldots & \ldots & \ldots \\ \alpha_{1n} & \alpha_{2n} & \ldots & \alpha_{nn} \end{bmatrix}$$

That is, it is a transposed matrix of the cofactors.

In the preferred embodiment, T statistics are calculated for each independent variable as a measure of the significance of that variable to the weather impact model 720. Values of the T statistics above about 1.5 are preferred the T statistics are calculated as:

$$T_i = \frac{\beta_i}{s\sqrt{V_i}}$$

Where s=Standard Error of the Regression $V_i$=ith diagonal element of the matrix $(X'X)^{-1}$.
The calculation $$s\sqrt{V_i}$$

is referred to as the Standard error of the independent variable. The Standard Error of the Regression, s, is calculated as:

$$s = \sqrt{\frac{ESS}{n-k}}$$

where the definitions are as above.

The present invention also considers the P-value, another measure of statistical significance, in the deweatherization regression. The P-value is the probability of the F statistic. In the preferred embodiment, it is used as a filter. In other words, if the F-statistic is 10%, there is a 90% probability that there is at least one explanatory variable in the weather impact model 720. In the preferred embodiment, the P-value used is an approximation rather than a precise calculation which involves solving integrals. This approach is apparent to one of ordinary skill in the relevant art. The terms N-k and k-1 which we used above are referred to in this algorithm as v and u respectively.

Additional discussion regarding this and the above statistical approaches may be found in Peizer, D. B. & Pratt, J. W., "A Normal Approximation For Binomial, F, Beta, And Other Common Related Tail Probabilities," *J. Am. Stat. Assoc.* 63:1416–1456 (1968) and Derenzo, S. E., "Approximations for Hand Calculators Using Small Integer Coefficients," *Mathematics of Computation* 31:214–222 (1977).

Once the weather impact model 720 has been determined, the correlation processor 704 then uses the resulting weather impact model 720 to forecast different values in step 906. The normal weather data 716 is substituted into weather impact model 720 for the historical weather data 714 to arrive at deweatherization data 205. Thus, the weather impact model 720 has to be generated before the deweatherized data 205 can be generated. This is referred to as the deweatherization data 205. Correlation processor 704 then outputs both, weather impact model 720 and deweatherization data 205.

V. Forecasting Processor

Figure 10:
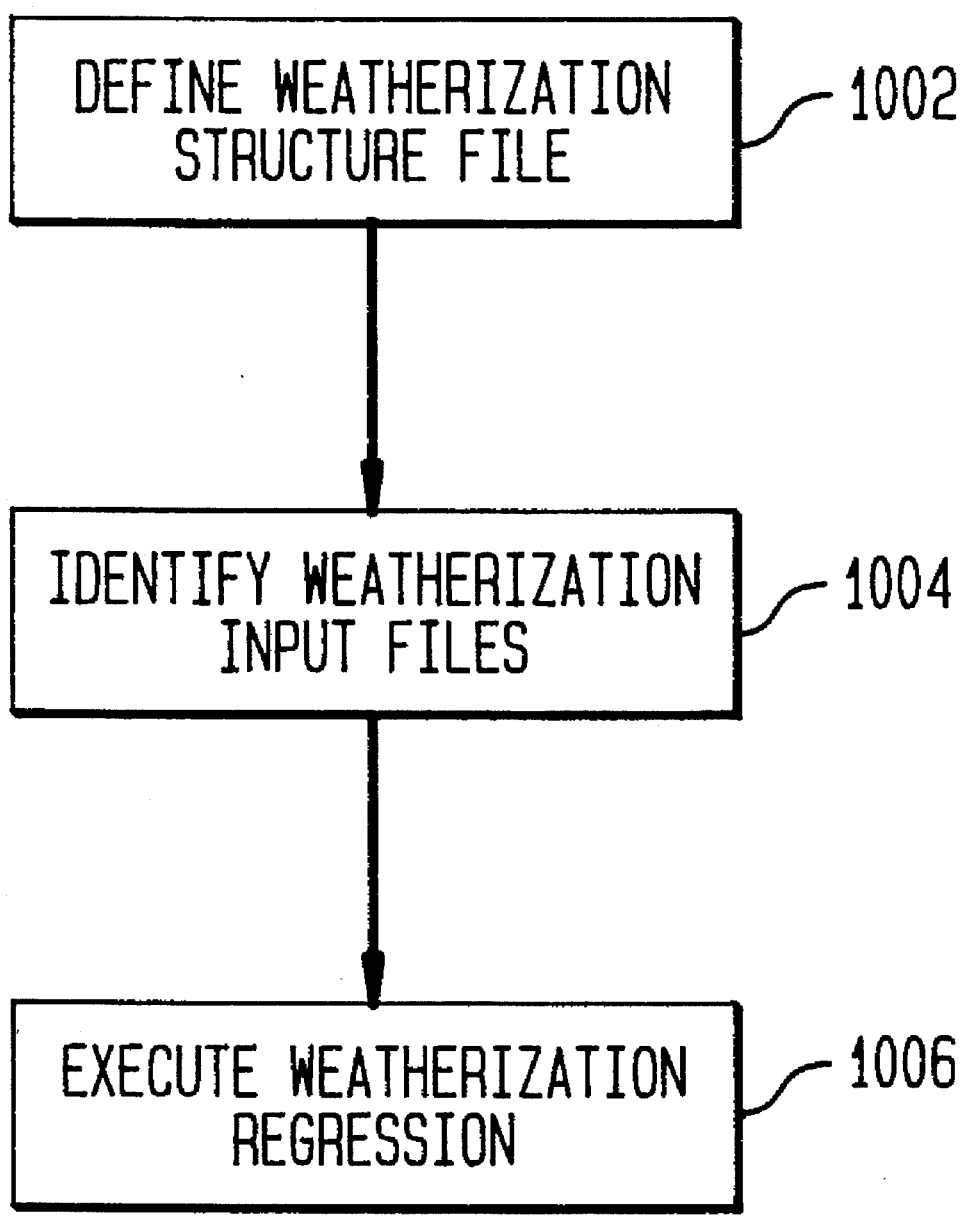
FIG. 10 is a flowchart of the functions performed by the forecasting processor.

FIG. 10 is a flowchart of the steps performed by forecasting processor 706. Referring to FIG. 10, forecasting processor 706 receives revised managerial plan 207, weather impact model 720, and deweatherization data 205. Weather impact model 720 and deweatherization data 205 are generated by correlation processor 704. The revised managerial plan 207 is the original managerial plan 130 modified according to the deweatherized data 205.

First, in step 1002, forecasting processor 706 defines a weatherization regression structure file. The weatherization structure file is similar to the deweatherization regression structure file discussed above. However, the weatherization regression structure file includes a forecast columns section and a forecast variables section in addition to the four previously mentioned sections under the database initializer.

The forecasting processor 706 then identifies weatherization input files in step 1004. In this step, forecasted weather data 716 is available from Strategic Weather Services, Wayne, Pennsylvania, U.S.A. to substitute into the weather-impact model 720 in addition to existing deweatherized data 205 and other external information 136.

The forecasting processor 706 then executes the weatherization regression step 1006. The output of this final step produces the weather-modified managerial plan 204 which is output to the graphical user interface 710 for representation and viewing.

Generally, computer software evolves in layers of program development, with the most basic layer being the computer code for the various computer operating systems. Other layers of software incorporate, typically under commercial license, pre-existing software programs as building blocks for innovative software to extend computer functionality.

In the preferred embodiment of the present invention, the database initializer 702, correlation processor 704, forecasting processor 706, are implemented with commercially available multi-dimensional software products, such as the 'ONE-UP' product, developed by Comshare Inc., Ann Arbor, Mich. The graphical user interface 710 is implemented in the 'COMMANDER' graphical user interface product manufactured by Comshare Inc. However, the present invention is not limited to these products, and contemplates any multi-dimensional modelling tool or SQL (Structured Query Language) based database or graphical user interface approach with similar or greater functionality.

Although the invention has been described and illustrated with a certain degree of particularity, it is understood that those skilled in the art will recognize a variety of additional applications and appropriate modifications within the spirit of the invention and the scope of the claims.

What is claimed is:

1. A computer-based system for generating a weather-modified managerial plan that represents the future impact of weather and other factors on retail sales, comprising:
   first means for providing store information;
   second means for providing weather data, said weather data including,
     historical weather data,
     normal weather data, and
     forecasted weather data;
   third means for providing information external to retailer store environment;
   database initializer means for performing one or more transformations of said store information, said weather data, and said external information to produce databases;
   correlation processor means for generating a weather impact model, said weather impact model expressing a correlation between said store information and said external information contained within said databases with said historical weather data, and for substituting said normal weather data for said historical weather data in said weather impact model to generate deweatherized data; and
   forecasting processor means for substituting said forecasted weather data for said normal weather data in said weather impact model to produce a weather-modified managerial plan.

2. The system of claim 1, wherein said deweatherized data is made available to a retailer to modify one or more portions of said managerial plan, resulting in a revised managerial plan.

3. The system of claim 2, wherein said substitution of said forecasted weather data in said weather impact model for said normal weather data is performed in conjunction with said revised managerial plan.

4. The system of claim 1, wherein said normal weather data comprises a 30 year average of a particular weather parameter for a specific location and time.

5. The system of claim 1, wherein said store information comprising point of sale data generated at one or more store locations and other store data, said other store data comprising any user specified recordable event taking place in support of consumer sales.

6. The system of claim 5, wherein said other store data comprises inventory transfer from distribution center to store, promotion data, store traffic, and labor data.

7. The system of claim 5, wherein said point of sale data is generated by electronic scanners, registers, and other electronic scanning and data gathering devices.

8. The system of claim 5, wherein said point of sale data includes product data, POS receipt data, promotional data, markdown data.

9. The system of claim 1, wherein the system is resident within a computer-based MIS architecture.

10. The system of claim 9, wherein said MIS architecture includes a data storage and retrieval facility configured to store said external information and said internal information.

11. The system of claim 1, wherein said external information comprises economic, demographic, competitive, or any other retailer-specified information valuable to assessing business performance.

12. The system of claim 1, wherein said weather data is measured in any user defined time increment.

13. The system of claim 12, wherein said time increment comprises daily time increments.

14. The system of claim 12, wherein said time increment comprises weekly time increments.

15. The system of claim 12, wherein said time increment comprises monthly time increments.

16. The system of claim 1, wherein said database initializer maps store locations to selected areas, thereby utilizing only necessary portions of said weather data associated with said selected areas.

17. The system of claim 1, wherein said database initializer creates retailer hierarchial structure tables, said retailer hierarchial structural tables indicating retailer-specified parent-child relationships.

18. The system of claim 1, wherein said weather data comprises any meteorological factor.

19. The system of claim 18, wherein said meteorological factors include temperature, precipitation, humidity.

20. The system of claim 1, wherein said managerial plan comprises buying product, distributing product to specific locations, advertising, promotions, financial budgeting, historical analysis, labor scheduling, and store traffic analysis.

21. The system of claim 1, wherein said forecasted weather data is in user-determined time increments for user-determined locations.

22. The system of claim 1, wherein said substitution of said forecasted weather data in said weather impact model for said normal weather data is performed in conjunction with said managerial plan.

23. The system of claim 1, wherein said substitution of said forecasted weather data in said weather impact model for said normal weather data is performed in conjunction with said deweatherization data.

24. The system of claim 1, further comprising a data manipulator means, coupled between said first means and said database initializer means, for aggregating said store transaction data.

25. The system of claim 1, wherein said first means comprises:
   data gathering means for recording said store transaction data; and
   a data storage and retrieval facility configured to receive said store transaction data from said data gathering means, and configured to store said store transaction data in a computer-readable format.

26. The system of claim 1, wherein said database initializer means transforms an aggregate of said store transaction data to a form that adds value to said correlation processor means.

27. The system of claim 26, wherein said database initializer means comprises:
   comparing means for comparing a first set of values occurring during a first interval in a first period with a second set of values occurring in a second interval in a second period, and for computing the change in said first and second sets of values, wherein said first and second intervals are equal to a first length of time and said first and second periods are equal to a second length of time, and wherein said first length of time is less than or equal to said second length of time.

28. The system of claim 27, wherein said first length of time is a week.

29. The system of claim 28, wherein said second length of time is a year.

30. The system of claim 27, wherein said first length of time is a day.

31. The system of claim 30, wherein said second length of time is a year.

32. The system of claim 27, wherein said database initializer means further comprises:
   lagging means for lagging said logged values of said historical weather data by a third interval, a fourth interval, and a fifth interval.

33. The system of claim 1, wherein said correlation processor means is configured to perform a least squares multiple regression on said databases to produce said weather impact model.

34. The system of claim 33, wherein said weather impact model expresses a correlation between said store transaction data contained in said databases and said historical weather data.

35. The system of claim 1, further comprising a graphical user interface for receiving said weather-modified managerial plan from said application processor means and for displaying said weather modified managerial plan in a user-specified manner.

36. A computer-based system for generating a weather-modified managerial plan that represents the future impact of weather and other factors on retail sales, comprising:
   first means for providing store information;
   second means for providing weather data, said weather data including,
      historical weather data,
      normal weather data, and
      forecasted weather data;
   third means for providing external information;
   database initializer means for performing one or more transformations of said store information, said weather data, and said external information to produce databases, wherein said database initializer maps store locations to selected areas, said database initializer means utilizing only portions of said weather data associated with said selected areas;
   correlation processor means for generating a weather impact model, said weather impact model expressing a correlation between said store information and said external information contained within said databases with said historical weather data, and for substituting said normal weather data for said historical weather data in said weather impact model to generate deweatherized data; and
   forecasting processor means for substituting said forecasted weather data for said normal weather data in said weather impact model to produce a weather-modified managerial plan.

* * * * *

UNITED STATES PATENT AND TRADEMARK OFFICE
CERTIFICATE OF CORRECTION

PATENT NO. : 5,491,629
DATED : February 13, 1996
INVENTOR(S) : Fox et al

It is certified that error appears in the above-indentified patent and that said Letters Patent is hereby corrected as shown below:

Column 15, line 42, "$\ldots + \beta_k X_{k2} \epsilon_2$" should read --$\ldots + \beta_k X_{k2} + \epsilon_2$--.

Signed and Sealed this

Eleventh Day of June, 1996

*Attest:*

BRUCE LEHMAN

*Attesting Officer*    Commissioner of Patents and Trademarks